United States Patent [19]
Cohen

[11] Patent Number: 5,881,315
[45] Date of Patent: Mar. 9, 1999

[54] QUEUE MANAGEMENT FOR DISTRIBUTED COMPUTING ENVIRONMENT TO DELIVER EVENTS TO INTERESTED CONSUMERS EVEN WHEN EVENTS ARE GENERATED FASTER THAN CONSUMERS CAN RECEIVE

[75] Inventor: Richard Jay Cohen, Austin, Tex.

[73] Assignee: International Business Machines Corporation, Armonk, N.Y.

[21] Appl. No.: 516,855

[22] Filed: Aug. 18, 1995

[51] Int. Cl.$^6$ .................................................. G06F 12/06
[52] U.S. Cl. ............... 395/872; 395/200.32; 395/200.64; 395/684
[58] Field of Search ..................... 395/650, 700, 395/600, 872, 200.32, 200.64, 684

[56] References Cited

U.S. PATENT DOCUMENTS

| | | | |
|---|---|---|---|
| 4,395,757 | 7/1983 | Bienvenu et al. | 364/200 |
| 5,075,847 | 12/1991 | Fromme | 395/700 |
| 5,230,048 | 7/1993 | Moy | 395/600 |
| 5,253,342 | 10/1993 | Blount | 395/200 |
| 5,345,588 | 9/1994 | Greenwood | 395/650 |
| 5,355,484 | 10/1994 | Record et al. | 395/650 |
| 5,404,521 | 4/1995 | Murray | 395/650 |
| 5,421,013 | 5/1995 | Smith | 395/650 |

OTHER PUBLICATIONS

"Implementation & Evaluation of a Parallel PMS Simulator", Manohar Rao et al, 1990 IEEE Publication.

"Architecture of an MMS event Manager", T. Richner et al, Compeuro '93 Computers in Design, Manufacturing and Production.

"Load Balancing Policies in Heterogeneous Distributed Systems", Jin–Long Wang et al, System theory 1994 Southeastern Symposium.

"Efficient Computation of End–to–End Performance Measures for Multi–Link ATM Networks with Multi–Media Traffic", Chou et al, Infocom '95 Mar.

"On–line Error Monitoring for Several Data Structures", Bright et al, Fault–Tolerant Computing, 1995, Int'l Symposium.

"Functional Approximation Theorems for Controlled Queuing Networks", Konstantopoulos et al, Decision & Control, 1993, 32nd Annual Conference.

*Primary Examiner*—Thomas C. Lee
*Assistant Examiner*—Albert Wang
*Attorney, Agent, or Firm*—Jeffrey S. LaBaw; David H. Judson

[57] ABSTRACT

An event management service (EMS) operating in a distributed computing environment includes a queueing mechanism for controlling passage of events through an event channel when multiple event consumers cannot consume events being generated by one or more event suppliers as the events are being generated. The queueing mechanism includes a number of queues: an input queue that receives queue elements for each event that reaches the service, an active queue that receives queue elements for each event that any event consumer has registered to receive, and a consumer queue for each event consumer registered to receive any event. A multi-threaded process control routine processes the queue elements to control passage of the events to the event consumers.

15 Claims, 5 Drawing Sheets

QUEUE MANAGEMENT FOR DISTRIBUTED COMPUTING ENVIRONMENT TO DELIVER EVENTS TO INTERESTED CONSUMERS EVEN WHEN EVENTS ARE GENERATED FASTER THAN CONSUMERS CAN RECEIVE

TECHNICAL FIELD

The present invention relates generally to computing networks and more particularly to methods for managing events in a distributed computing environment domain.

BACKGROUND OF THE INVENTION

It is well known to interconnect multiple computers into a local area network (LAN) to enable such computers to exchange information and share resources. A local area network provides a distributed computing environment in which users can access distributed resources and process applications an multiple computers. An "event" marks a change in state of some managed resource in the environment.

A known distributed computing environment, called DCE, has been implemented using software available from the Open Systems Foundation (OSF). Prior OSF DCE computer network implementations provide event services on a local level only. Thus, events generated on a particular machine in the network are only logged or displayed on the machine itself. Other machines in the network have no efficient means for receiving notification when events occur in remote resources in the network. This deficiency makes it difficult for a system manager to remotely manage other resources in the network.

There are event service architectures known in the prior art. One known architecture is the DME Event Service (EVS), which is described in "DME Event Services Architecture, Version 2.0" by Ferrante, dated Apr. 28, 1993. This service uses the concept of event suppliers (who produce event data) and event consumers (who process event data generated by the suppliers), but the service has a cumbersome subscription mechanism, is complex and cannot be integrated into other existing DCE services. Another known architecture is the OMG Event Service model, which is described in the "Joint Object Services Submission—Event Service Specification," OMG TC 93.7.3, dated Jul. 2, 1993. This architecture provides an object-based event service that defines two basic models for communicating event data: the push model, which allows event suppliers to initiate the transfer of events to consumers, and the pull model, which allows event consumers to request events from event suppliers. Theoretically, an event channel object allows multiple suppliers to communicate with multiple consumers in an asynchronous way. The main drawback to the OMG Event Service model is that there are no currently-available implementations.

There remains a need to provide event management services for both traditional and object-oriented system architectures wherein managed resources can send asynchronous notifications or "events" to interested parties.

BRIEF SUMMARY OF THE INVENTION

It is thus a primary object of the present invention to allow multiple event suppliers to communicate with multiple event consumers in an asynchronous fashion in a distributed computing environment.

It is a another more specific object of the invention to tightly integrate an event management service into an existing distributed computing environment event service to transparently supply events in an asynchronous manner to authorized, remote event consumers.

It is a further object of this invention to communicate events between event supplier and event consumer by issuing remote DCE procedure calls (RPC's).

It is still another object of the present invention to provide a DCE RPC-based asynchronous event management service wherein event suppliers and consumers are authenticated prior to using the service by a DCE security service.

It is yet a further more specific object of the invention to integrate an event management service into a DCE network implementation using event forwarding, security and remote procedure call services in the DCE network.

It is still another object of the invention to filter events generated by one or more event suppliers to determine whether particular events are communicated to one or more event consumers.

According to another more specific object of the invention, event consumers can locate and register with one or more event management services running on multiple host computers in the network. Event consumers can control which host computers send events and the particular types of events sent.

It is still another object of the invention to manage events wherein event suppliers are not aware of the event consumers that have registered to receive events. Preferably, a particular supplier need only send an event once to ensure that interested event consumers receive notification of that event.

It is a more general object of the invention to reliably deliver events to consumers with minimal network and system load, and in a manner that is tolerant of network and machine failures.

In one illustrative embodiment, a method of managing events in a distributed computing environment is provided wherein one or more event suppliers generate events to be consumed by one or more event consumers. The method begins by having an event consumer register with an event management service (EMS) to receive selected events generated from the one or more event suppliers. In response to a remote procedure call (RPC) from a DCE event recording service, the event management service uses a filtering mechanism to determine whether the event associated with the RPC has been selected by the event consumer. If the EMS determines that the event associated with the RPC has been selected by the event consumer, it issues a remote procedure call to supply the event to the event consumer. When multiple event consumers register with the event management service, events occurring on remote machines in the network are asynchronously and transparently supplied to event consumers.

In this event service, often multiple event consumers are interested in the same event data, yet event consumers may not be able to consume events as fast as they are transmitted from the service. In addition, it is desired that when sending an event, suppliers should not be blocked while trying to forward the event to EMS, and the event service should not be blocked while attempting to forward the event to interested consumers. To achieve these goals, the Event Management Service implements a novel queueing mechanism that utilizes a number of threads-based services including a process control routine to insure that neither event suppliers nor event consumers take any actions that block the event channel.

In one embodiment, the queueing mechanism comprises an input queue, an active queue and a plurality of consumer queues, with each consumer queue being associated with an event consumer interested in receiving events. Each such queue may have a thread process associated therewith and receives queue element(s), with each queue element having a pointer to an event or to another queue element in another queue. The input queue receives a queue element for each event passed by the filter mechanism. After such receipt, the queue element is thereafter dequeued from the input queue, whereupon another thread process enqueues a queue element onto the consumer queue of each event consumer interested in receiving the event (as determined by the filter). The queue element in each such consumer queue points back to the queue element dequeued from the input queue. Once all relevant consumer queues receive their queue elements, the queue element dequeued from the input queue is then enqueued onto the active queue. That queue element remains in the active queue until all event consumers interested in receiving the event have received it.

Thus, according to the invention, the queueing mechanism includes an active queue having at least one queue element associated with an event that at least one event consumer has an interest in receiving. This queue element has a count identifying a number of event consumers that have interest in receiving the event. There is also a plurality of consumer queues each associated with an event consumer having an interest in receiving the event. Each consumer queue has a queue element pointing to the at least one queue element in the active queue. A control means is used for (a) delivering the event associated with the queue element of each consumer queue to an associated event consumer, (b) modifying the count with each delivery of the event associated with the queue element of a consumer queue, and (c) retaining the queue element of the active queue in the active queue until the count reaches a predetermined value indicating that all interested event consumers have received the event.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
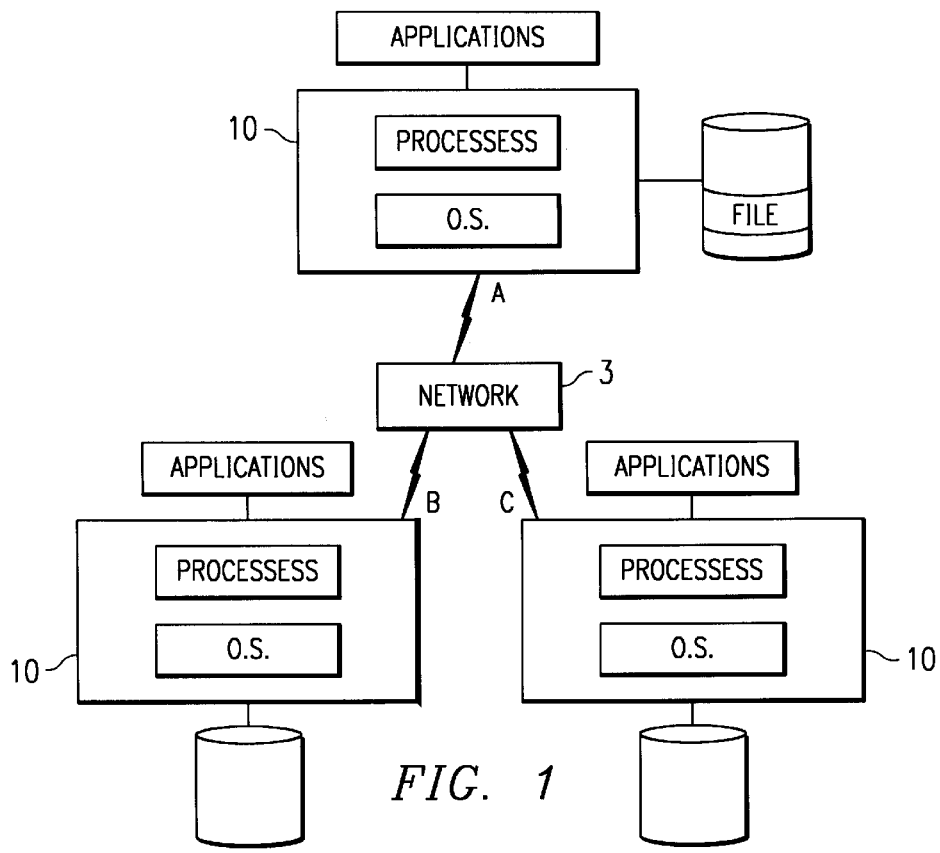
FIG. 1 illustrates a computer network in which the present invention is implemented.

A known distributed computing environment (DCE) is illustrated in FIG. 1 and includes two or more nodes A, B and C connected through a communication link or network 3. The network 3 can be a local area network (LAN) or a wide area network (WAN), the latter comprising a switched or leased teleprocessing (TP) connection to other nodes or to a network of systems operating under a known computer architecture, At any of the nodes A, B or C there may be a processing system 10A, 10B or 10C. Each of these systems may be a single user system or a multi-user system. Each of the processing systems may operate as a client or server, depending on whether it is requesting or supplying services.

Each of the processing systems is a computer, referred to herein sometimes as a "machine." For example, each computer may be a RISC System/6000® (a reduced instruction set or so-called RISC-based workstation) running the AIX® (Advanced Interactive Executive) operating system. The AIX® operating system is compatible at the application interface level with AT&T's UNIX operating system, version 5.2. The various models of the RISC-based personal computers are described in many publications of the IBM Corporation, for example, RISC System/6000, 7073 and 7016 POWERstation and POWERserver Hardware Technical Reference. Order No. SA23-2644-00. The AIX operating system is described in AIX Operating System Technical Reference, published by IBM Corporation, First Edition (November, 1985), and other publications. A detailed description of the design of the UNIX operating system is found in a book by Maurice J. Bach, *Design of the Unix Operating System*, published by Prentice-Hall (1988). Alternatively, each computer may be an IBM® PS/2® running under the OS/2® operating system. For more information on the PS/2 line of computers and the OS/2 operating system, the reader is directed to *Technical Reference Manual Personal System/2 Model 50, 60 Systems IBM Corporation*, Part No. 68x2224 Order Number S68X-2224 and OS/2 2.0Technical Library. Programming Guide Volumes 1–3 Version 2.00, Order Nos. 10G6261, 10G6495 and 10G6494.

In one particular implementation, the invention runs on a plurality of IBM RISC System/6000 machines interconnected by IBM's Transmission Control Protocol/Internet Protocol (TCP/IP) architecture. TCP/IP uses as its link level Ethernet, a local area network (LAN) developed by Xerox Corporation. A simplified description of local area networks may be found in a book by Larry E. Jordan and Bruce Churchill entitled *Communications and Networking for the IBM PC*, published by Robert J. Brady (a Prentice-Hall Company)(1983). Although the invention is described in the above-identified context, it should be appreciated that the teachings herein may be implemented using other and different computers interconnected by other networks than the Ethernet LAN or IBM's TCP/IP.

Figure 2:
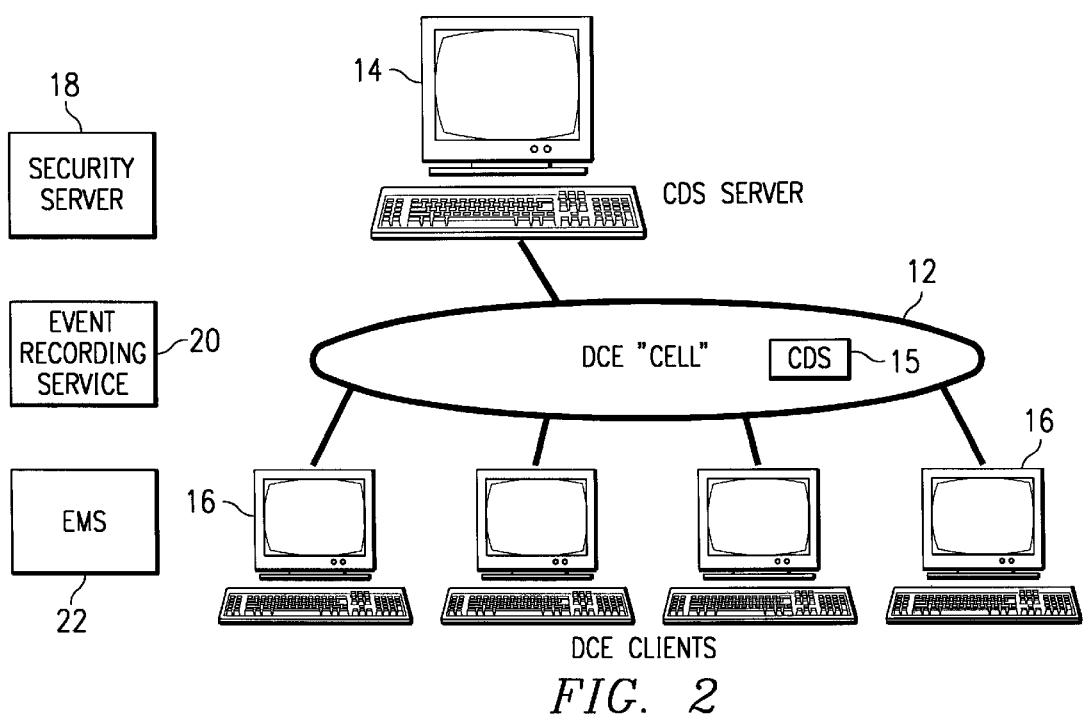
FIG. 2 illustrates a representative distributed computing domain of connected machines in which the invention is implemented.

Preferably, the invention is implemented in a distributed computing environment having any number of machines, and these machines may be located in different geographic locations. For illustrative purposes, the remainder of the detailed discussion is directed to a DCE domain or "call," which is a relatively smaller version of the network (with up to about 25 machines), although the teachings of the invention are applicable to any distributed computing environment (whether traditional (SNMP and CMIP) or object-oriented). FIG. 2 shows a representative DCE cell 12 in which the present invention is implemented. The cell 12 comprises a set of connected machines, including at least one server 14 and the DCE clients 16, which share a common cell name and a namespace. Each cell provides a location independent namespace service called CDS, or Cell Directory Service 15. The naming service is used by application servers to store their location and interfaces, known as server bindings. The cell typically includes one or more other server machines that provide other services of the distributed computing environment. These other services include, without limitation, a Security Service 18, which facilitates authentication, and an Event Recording Service 20, which is a DCE service that application developers may use to record application events.

In a known DCE implementation, events are of several types. "Service" events typically include such things as error messages, warnings, abort messages and generic resource information. Another type of event is an "audit" event. Known DCE implementations include a Serviceability (SVC) interface and an Audit interface within the Event Recording Service 20 for processing these events. The SVC and Audit interfaces allow recording of events.

According to one feature of the present invention, calls to the Serviceability and Audit interfaces within the Event Recording Service 20 are automatically provided via remote procedure calls (RPC's) to an Event Management Service (EMS) 22, which is also a server called "emsd," to facilitate asynchronous event management of events by and among so-called "event suppliers" and "event consumers." The EMS 22 may also be reached by being called directly. For convenience, the passage of events through the SVC or Audit interfaces is sometimes referred to a first level or "supplier-side" event filtering. Generally, an event supplier is a DCE-based application (including DCE core servers) which emits events. An "event" refers to the change of state of some managed resource and is embodied in the data transmitted between an event supplier and EMS, and between EMS and one or more event consumers. Such event data consists of an event header, and a list of event attributes which contain event type specific data. In one implementation, all DCE applications that use the SVC or Audit interfaces of the Event Recording Service 20 are event suppliers. An "event consumer" is any DCE server application which registers with the EMS 22 (as will be described) to receive and process events from one or more "event suppliers."

Figure 3:
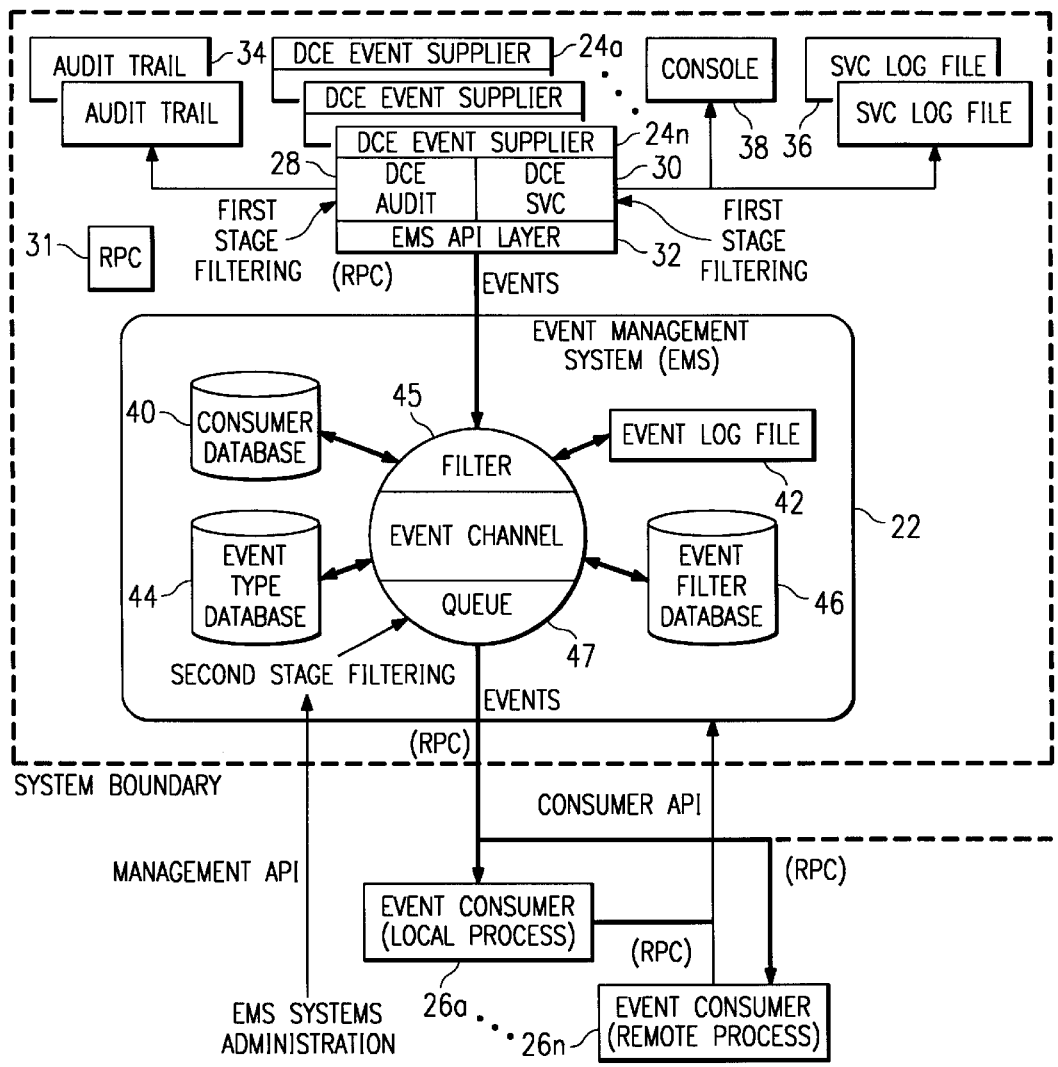
FIG. 3 is a diagram showing a representative implementation of the event management service of the invention within the context of a pre-existing DCE subsystem.

Turning now to FIG. 3, a diagram is shown illustrating one preferred implementation of the event management service of the present invention within an existing DCE system. The DCE subsystems and functionality are illustrated and include the DCE SVC and Audit interfaces 28 and 30, and remote procedure call (RPC) mechanisms 31. An EMS Application Programming Interface (API) 32 may be used by event supplier(s) to reach the Event Management Service 22. EMS 22 acts as an "event channel" to uncouple one or more event suppliers 24a–24n from the one or more event consumers 26a–28n. Communications through the event channel are "asynchronous" in that they may be provided to the event consumers at any time. Event consumers may be local or remote processes as shown. Communications between event suppliers and the EMS, on the one hand, and between the EMS and event consumers, on the other hand, are carried out using remote procedure call mechanisms of the DCE system. The portion of the drawing within the dotted line reflects (for representative purposes only) a single host computer of the distributed computing environment on which the EMS 22 and the plurality of DCE event suppliers 24 reside. The Event Recording Service 20 includes audit trails 34, SVC log files 36 and a console 38 where management functions are carried out.

As will be described in more detail below, the Event Management Service includes a number of databases and memory structures: a Consumer Database 40, an Event Log File 42, and Event Type Database 44, and an Event Filter Database 46. In order to start receiving events, it is preferred that an event consumer must first register with EMS 22. One representative technique for registering an event consumer includes providing the event consumer with a handle describing a connection to the event service and then having the consumer use that handle to issue an RPC to EMS. EMS then places an entry in the Consumer Database 40 that uniquely identifies the consumer. A "supplier" registers with the event management service by receiving a handle. The registration process thus defines a connection to a specific EMS process running on a specific machine. Although not required, registration may also involve having event consumers and event suppliers authenticate themselves with the DCE Security Service (not shown).

Consumers that have registered with EMS are identified in the Consumer Database 40. The Event Log File 42 stores a collection of events to be sent to event consumers. The event log stores events in case EMS cannot forward events to all appropriate event consumers (e.g., because network connections are down). An event is deleted from the event log after that event is forwarded to all relevant consumers.

Before the event consumer can receive event data, however, it must also define a "filter" which EMS then uses to determine whether particular events from the one or more event suppliers gets passed to that event consumer. Initially, the event consumer uses general "event type" information in the Event Type Database 44 to create an particular "event filter group" for that consumer. As will be seen, the information in the Event Type Database 44 is also used by event suppliers and, possibly, an EMS administrator. The filter data selected or specified by an event consumer is then stored in the Event Filter Database 46.

Event Type Database 44 stores information used by EMS and event suppliers and consumers to generate "event types," each of which are a class of events that have the same event type format. An event type format is described via an "event type schema" and identified by a unique universal identifier (UUID). An event type schema is a description of an event type and consists of a list of attribute name/type pairs which specify the data format of an event. An attribute name is a string that uniquely identifies an attribute of a given event type. An attribute type is the data type of an event attribute, which defines the format of the data in the attribute. Event type schema data (stored in database 44) and/or event header information is used by an event consumer to construct an "event filter group" to tell EMS which events to forward to that consumer.

Figure 4:
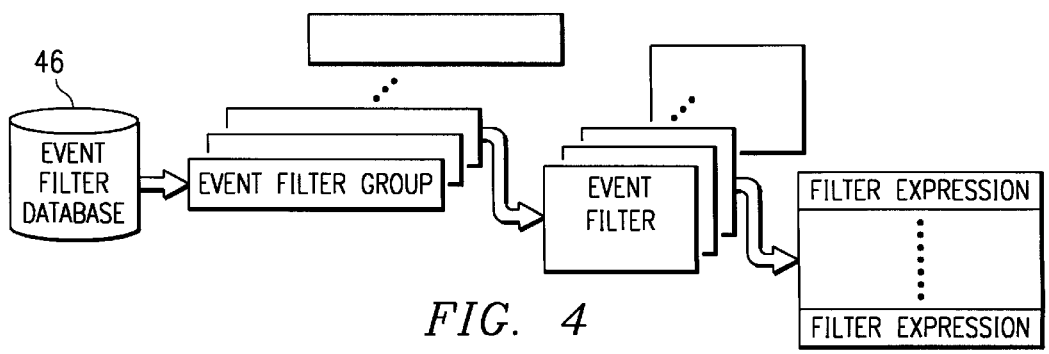
FIG. 4 is a diagram showing how event filters are formulated according to the present invention.

Referring to FIG. 4, an event filter group is a collection of one or more "event filters" which are logically ORed together. There is one event filter group per registered event consumer. An "event filter" is a collection of one or more "filter expressions" which are logically ANDed together, and each event filter has an event filter name and event type (which may be generic). As many event filter names as desired can be added to a consumer's event filter group to control what events EMS will send to that consumer. The event filter names are listed in the Consumer Database. An event "filter expression" is preferably a 3-tuple consisting of the attribute name, the attribute value, and an attribute operator which defines a compare operation. The attribute operator in a filter expression is used to effect the comparison between the named attribute in the event and the attribute value. The attribute name in a filter expression may refer to an attribute name in an event type schema or header information. Thus, for example, if the header information includes time-stamp information, the event filter group may contain a filter having an event filter expression that refers to time-stamp information in the header.

Figure 5:
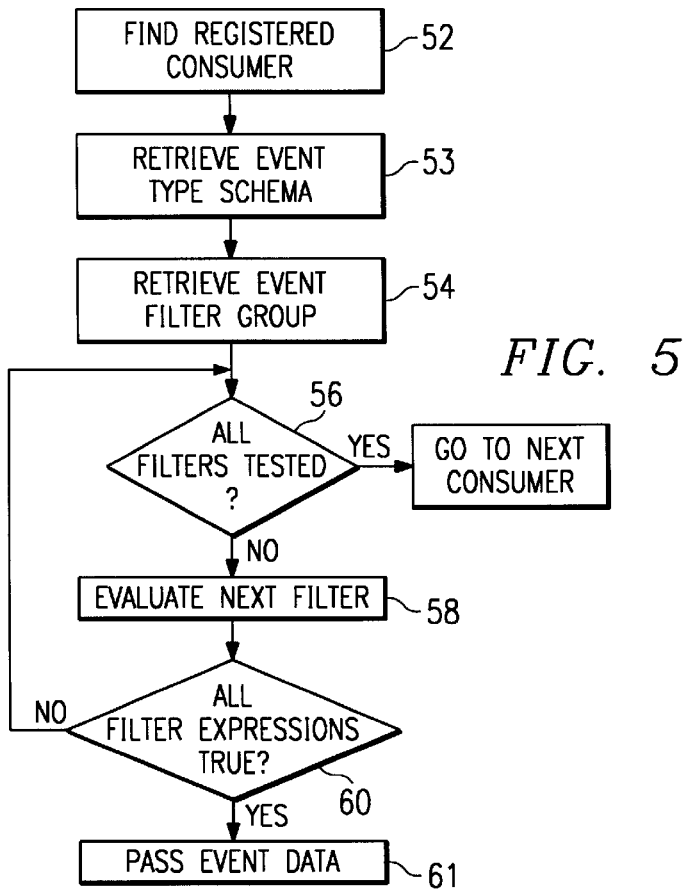
FIG. 5 is a flowchart illustrating an event consumer parser routine of the filter mechanism according to the invention.

Referring back to FIG. 3, to reach EMS an event passes through the Event Recording Service to EMS or EMS is called directly. Once the event arrives at EMS via a remote procedure call (RPC), it is stored in the Event Log 42. EMS 22 then performs a parsing operation to determine whether the event gets passed on to any event consumers. The information stored in the Event Filter Database 46 is a second stage or "consumer-side" EMS filter 45 that EMS 22 uses to make this evaluation. The second state filtering process is also illustrated in the flowchart of FIG. 5. After filtering, a queueing mechanism 47 is used as discussed below) to control the flow of events to the interested consumers. After the event is forwarded to all interested consumers, it is deleted from the Event Log 42 (and the queues).

The filtering routine begins each time an event reaches EMS. At step 52, EMS retrieves the event type schema for the particular event from the Event Type Database. At step 54, EMS 22 goes through the list of registered event consumers in the Consumer Database 40. For each registered consumer, the following processing occurs. At stop 65, the registered consumer's event filter group is first retrieved from the Consumer Database. As described above, each event filter group refers to a collection of one or more filters, each of which include a list of one or more filter expressions. A parser protocol is then initiated. In particular, at step 56, the routine determines if all filters in the event filter group have been evaluated. If not, the routine continues at step 58 by evaluating a next filter in the event filter group. Within each filter, the routine looks at each filter expression, A test is then performed at step 60 to determine if all of the filter expressions within a particular filter are a predetermined condition, namely TRUE. If so, the routine passes the event to the RPC mechanism for delivery to the registered event consumer. If the outcome of the test at step 80 indicates that any one of the filter expressions in the filter are FALSE, then the routine returns to step 56 to obtain a next filter in the event filter group (as identified by a next event filter name). If the outcome of the test at step 56 indicates that all filters of the consumer's event filter group have been evaluated, the routine ceases and EMS goes on to the next consumer. Thus, according to the parser, unless all filter expressions in a particular filter of an event filter group are TRUE, the event is not forwarded by EMS to the event consumer.

Referring briefly back to FIG. 3, an event consumer may use the Consumer API to define a new event filter and add it to an event filter group. A consumer may also obtain a list of existing event filter names and add one of those event filter names to an event filter group. Event filter names (and thus filters) can be added or deleted from event filter groups by the consumer (through the Consumer API) as well as by an EMS administrator through a Management API as shown. Thus, the event consumer may modify the event filter group to add or delete new filters.

Event type schemas stored in the Event Type Database are preferably used in several different ways according to the invention. A consumer can request a list of supported event types and pick which event types it wants to receive by using the event type schemas to construct event filters. An event consumer also can map events according to attribute names. Event suppliers use event type schemes to define new event types they intend to produce. EMS uses event type schemas to apply event filters to events.

In many cases, multiple event consumers are interested in the same event data, yet event consumers may not be able to consume events as fast as they are transmitted from the service. In addition, it is desired that when sending an event, suppliers should not be blocked while trying to forward the event to EMS, and the event service should not be blocked while attempting to forward the event to interested consumers. To achieve these goals, the Event Management Service implements the queueing mechanism 47 which comprises queue defining data structures and a set of queue manipulation routines. These routines preferably use another existing DCE service, DCE Threads, to provide event queue management for the DCE Event Management Service. As is known in the art, threading allows multiple routines conceptually to run simultaneously and to share resources. The DCE Threads service is a set of routines that can be used to create a multi-threaded program. Multi-threading is used to improve the performance of a program by allowing pieces of the program to operate concurrently. DCE Threads is a user-level (nonkernel) threads package based on the PTHREADS interface specified in "Draft 4 of the POSIX 1003.4 Standard", which is incorporated herein by reference.

Figure 6:
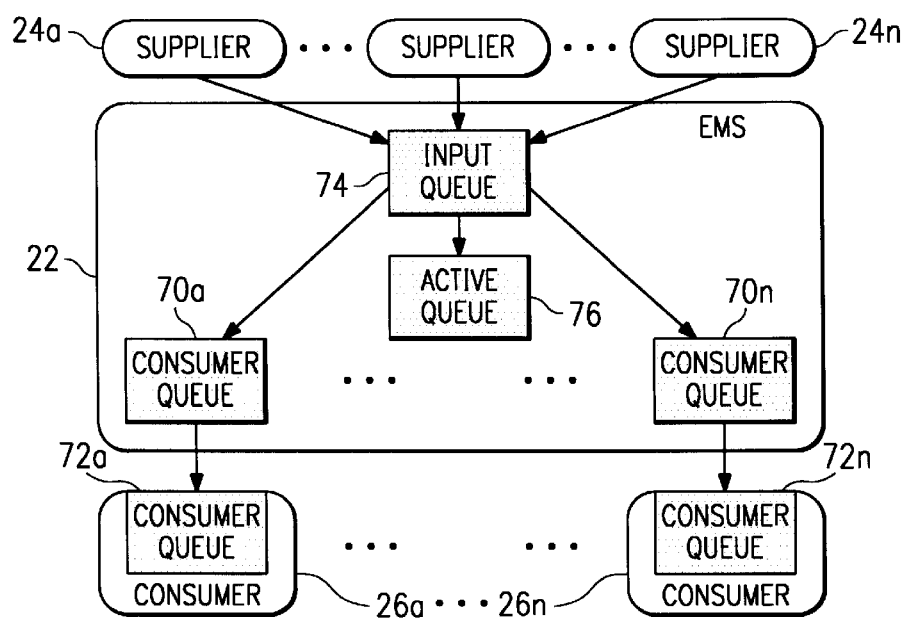
FIG. 6 is a diagram showing a queue configuration for the event management service.

The event queue mechanism is now described. According to the invention, and with reference to FIG. 6, whenever an event consumer registers with the EMS 22, a consumer queue 70a for that consumer is established within EMS. As seen in FIG. 6, the consumer process also has a corresponding event queue 72a. The event service maintains two queues, an input queue 74 and an active queue 76. According to the invention, each queue has a number of queue elements, and each queue element can have one of two types of data: a pointer to an event, or a pointer to another queue element. A preferred data structure for the event queue mechanism is set forth below:

```
typedef struct event_queue_s_t {
    pthread_cond_t    qempty;             /* qempty condition              */
    pthread_mutex_t   qempty_cond_lock;   /* lock for condition variable   */
    pthread_cond_t    qfull;              /* qfull condition               */
    pthread_mutex_t   qfull_cond_lock;    /* lock for condition variable   */
    pthread_mutex_t   qmutex;             /* mutex for adding and deleting */
                                          /* queue elements                */
    qel_t *           qin;                /* where to push elements        */
    qel_t *           qout;               /* where to pop elements from    */
    pthread_t         qthread_handle;     /* process element thread        */
```

| | | | |
|---|---|---|---|
| process_element_t | process_element; | /* routine to process queue | */ |
| | | /* elements | */ |
| void * | pe_arg; | /* argument to process element | */ |
| | | /* routine | */ |
| int | qcount; | /* number of elements on queue | */ |
| int | qmax | /* maximum queue size | */ |
| } event_que_t; | | | |

The event queue contains the following features. The empty and full condition variables (qempty and qfull) are used to wait until the queue is not empty or not full, respectively. A condition variable allows multiple threads to coordinate their processing. Queue mutex is used for enqueueing (e.g., pushing) and dequeueing (e.g., popping) elements onto the queue to provide multithreaded access to a queue. A mutex is a variable used to protect or "lock" storage areas that can be otherwise accessed simultaneously by multiple threads. The process element routine (process_ routine) is a user-written routine with a defined signature which is called to process queue elements. Each queue can get its own thread which calls this routine. The event queue also has a maximum queue size (qmax). When the queue reaches this size, it waits on the full condition variable until not full. The event queue also includes a queue persistence element. Each element on the queue may be saved using a DCE backing store service so that if the EMS goes down, the event queues can be restored.

Figure 7:
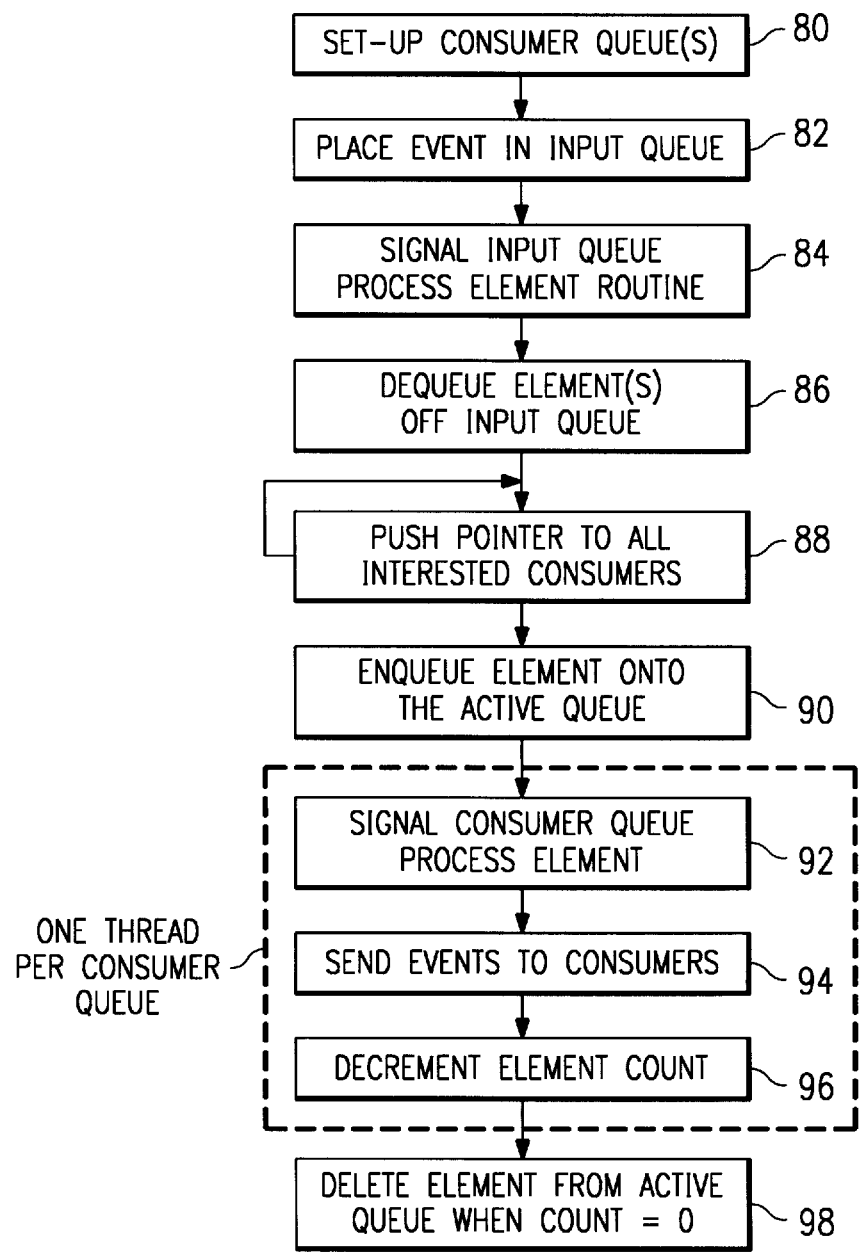
FIG. 7 is a flowchart illustrating an event queue management routine of the invention.

The active queue 76 of EMS has queue elements pointing to events that have not been sent to all interested consumers (i.e. those that have indicated an interest in receiving the event in question as determined by the consumer's event filter group), with each queue element corresponding to one event. The active queue is a holding station for the queue elements (one per event) while EMS is notifying each event consumer whose event filter group passes the event to the input queue. Each queue element in the active queue also has a mutex protected count of how many relevant event consumers have yet to receive notice of the event. The consumer queues 70 of EMS have elements that contain pointers to elements in the active queue 76. Routines of the queue mechanism are used to create and initialize a queue, to destroy a queue, to "push" an element on a queue, to "pop" an element off a queue, to delete an element from a queue, and to activate a queue (after restoring it), Referring now to FIG. 7, a queue management routine is now described in detail. The routine begins at step 80 by setting up a consumer queue 70 for each registered event consumer. When an event is sent to EMS 22, it is immediately enqueued on the input queue 74, and the RPC routine returns. This is step 82 in FIG. 7. The input queue process element routine of the queue mechanism, which is running in a separate DCE thread, is then signaled at step 84. This indicates that the input queue 74 is not empty. At step 86, the element is dequeued from the input queue 74 (and the process repeats for other elements on the input queue). With respect to each queue element taken off the input queue, the following processing occurs. If any consumer is interested in the event that the element points to, then at step 88 a pointer to that queue element is enqueued onto that consumer's queue 70 and the queue element count is incremented. At step 90 (after the consumer queues 70 of the interested consumers have been updated to receive pointers), the queue element for the event (with the incremented count equal to the number of event consumers interested in the event) is then enqueued onto the active queue to wait for all the consumers to receive the event. Thus, preferably the consumer queue(s) of interested consumers receive their own distinct queue elements (with pointers to the queue element dequeued from the input queue) between the time the queue element is taken off the input queue and put on the active queue.

When the queue element is enqueued onto one of the consumer queues 70 (of the EMS), the thread running the consumer queue process element routine is signaled, as indicated at step 92, and that routine dequeued the queue element off the queue and, at step 94, sends it to the associated consumer queue 72. Once sent, the count (qcount) associated with the queue element (in the active queue) is decremented. This is step 96, When that count reaches zero, all interested consumers have been notified and the queue element is deleted from the active queue as indicated at step 98.

Each of the steps 92, 94 and 96 are carried out in a distinct thread, and thus multiple instances of these steps occur simultaneously with respect to the consumer queue(s) 70. When all threads have been successful in sending the particular event, the event is deleted from the active queue and the Event Log 42.

As noted, each consumer process also has an event queue 72 as seen in FIG. 6. When an event is sent to the consumer, the event is put on this queue, and a signal is sent to the process element routine, which in turn pops elements off the consumer queue 72, and calls an event handler routine to retrieve the event.

The EMS service preferably requires events to be queued to support delivery of event information to multiple consumers interested in the same event and to facilitate movement of events through the event channel even though event handlers (on the consumer side) cannot consume events as fast as suppliers generate them. The generic threads-based event queueing mechanism solves this problem by establishing a set of queues within EMS itself: an input queue, an active queue and a consumer queue for each registered event consumer. These queues support event-related information within the data elements of the queue data structure. Although not required, preferably the queueing mechanism includes (a) multiple threads (reached by RPC's) that place queue elements on the input queue, (b) a dedicated thread that dequeues elements off the input queue, puts pointers on the consumer queue(s) and then enqueues the queue element on the active queue, and (c) one thread per consumer queue which dequeuee queues therefrom and sends the events to the event consumer via RPC's. The consumer queue thread also functions to remove the queue element from the active queue when the mutex protected count reaches zero.

One of the preferred implementations of the EMS queueing mechanism of the invention is as a set of instructions in a code module resident in the random access memory of a computer. Until required by the computer, the set of instructions may be stored in another computer memory, for example, in a herd disk drive, or in a removable memory such as an optical disk (for eventual use in a CD ROM) or floppy disk (for eventual use in a floppy disk drive). In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Figure 8:
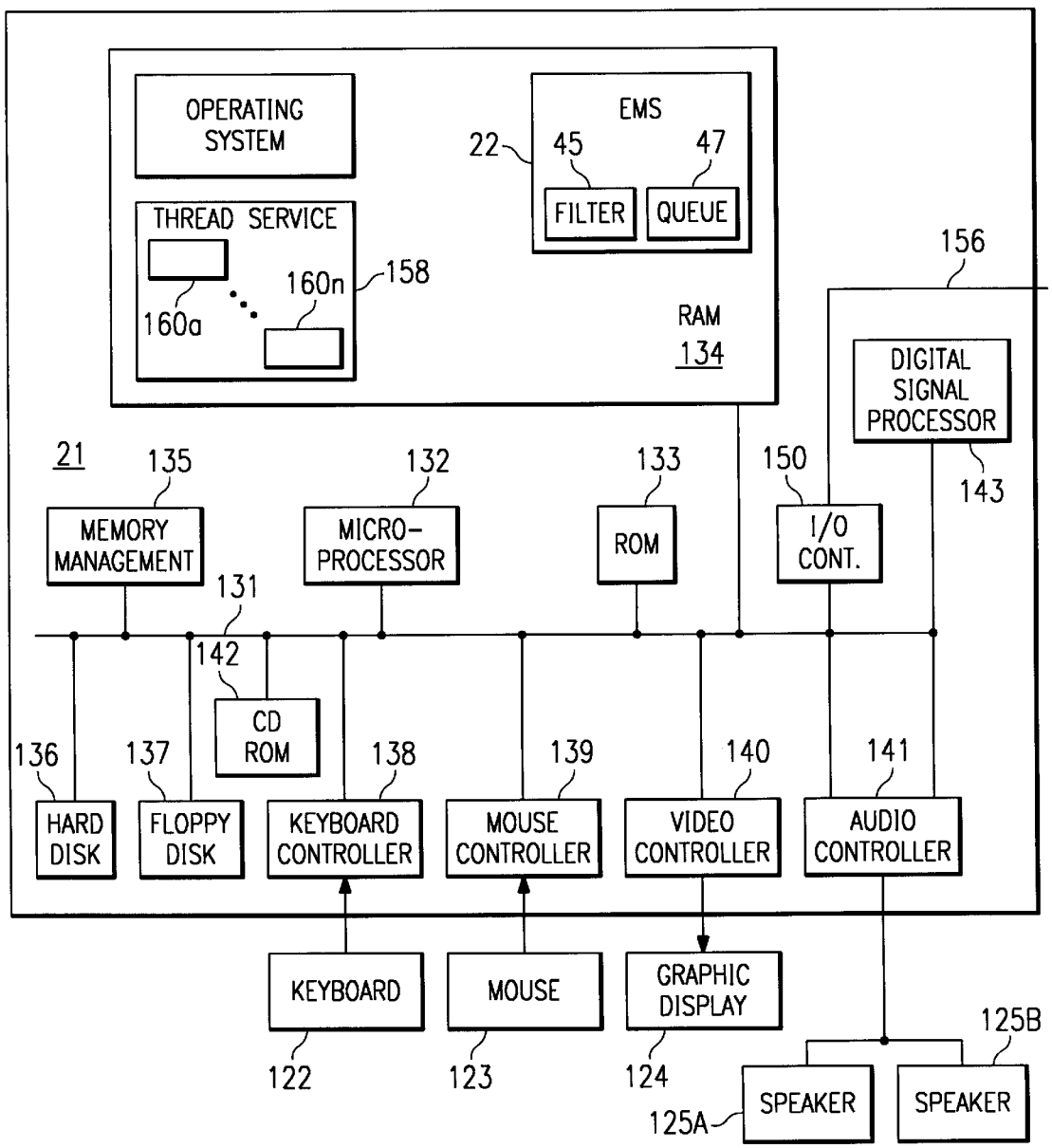
FIG. 8 is a block diagram of a computer system in which the event management service of this invention is implemented.

Referring now to FIG. 8, FIG. 8 shows a block diagram of a representative computer system in which the present invention is implemented. The system unit 21 includes a system bus or plurality of system buses 131 to which various components are coupled and by which communication between the various components is accomplished. The microprocessor 132 is connected to the system bus 131 and is supported by read only memory (ROM) 133 and random access memory (RAM) 134 also connected to system bus 131. The microprocessor may be of the Intel family of microprocessors, including the 386 or 486 microprocessors, or some other microprocessor such as one of Motorola's family of microprocessors (the 68000, 68020 or the 88030 microprocessors) or one of the RISC microprocessors manufactured by IBM, Hewlett Packard, Sun, Intel, Motorola and others.

The ROM 133 contains among other code the Basic Input-Output system (BIOS) which controls basic hardware operations such as the interaction and the disk drives and the keyboard. The RAM 134 is the main memory into which the operating system and application programs are loaded. The memory management chip 135 is connected to the system bus 131 and controls direct memory access operations including, passing data between the RAM 134 and hard disk drive 138 and floppy disk drive 137. The CD ROM 142, also coupled to the system bus 131, is used to store a large amount of data, e.g., a multimedia program or large database.

Also connected to this system bus 131 are various I/O controllers: the keyboard controller 138, the mouse controller 139, the video controller 140, and the audio controller 141. The keyboard controller 138 provides the hardware interface for the keyboard 122, the mouse controller 139 provides the hardware interface for the mouse 123, the video controller 140 is the hardware interface for the display 124, and the audio controller 141 is the hardware interface for the speakers 125a and 125b. An I/O controller 150 such as a Token Ring Adapter enables communication over a network 156 to other similarly configured data processing systems.

As seen in FIG. 8, the RAM 134 supports the event management service 22 including the queue mechanism 47. The thread service is illustrated by the block 158 having a plurality of thread processes 160a–160n.

Further, although the invention has been described in terms of a preferred embodiment in a specific operating system and network environment (OSF DCE), those skilled in the art will recognize that the invention can be practiced, with modification, in other and different operating systems and network architectures within the spirit and scope of the appended claims. The invention is not to be construed as limited to the OSF DCE architecture and thus in a more general sense the invention should be broadly construed to cover any network environment, whether traditional or object-oriented.

Importantly, although the above description relates to an event management service of a distributed computer network, it is envisioned that the inventive queueing mechanism is applicable whenever it may be desired to control the flow of information of data between one or more suppliers, on the one hand, and one or more consumers, on the other hand. Thus the invention should not be considered limited to providing event queue management merely for an event management service. Rather, the mechanism is useful in any system wherein one or more suppliers supply information or data (which may be conveniently referred to as "data packets") through a forwarding service to one or more consumers, and where it is desired that suppliers should not be blocked while trying to forward the data packets to the service and the service should not be blocked while attempting to forward the packets to the interested consumers. Suppliers and consumers may be any process or machine (and any client or server) running in the distributed computer network.

Having thus described my invention, what I claim as new and desire to secure by Letters Patent is set forth in the following claims:

1. A queueing mechanism for an event management service operating in a distributed computing environment, wherein the event management service provides an event channel through which one or more event consumers are notified of events, wherein an event represents a change in state of a resource in the distributed computing environment and is supplied to the event management service by an event supplier, the queueing mechanism comprising:
   an active queue having at least one queue element associated with an event that at least one event consumer has an interest in receiving, said queue element having a count identifying a number of event consumers that have interest in receiving the event;
   a plurality of consumer queues each associated with an event consumer having an interest in receiving the event, each consumer queue having a queue element pointing to the at least one queue element in the active queue; and
   control means for (a) delivering an event associated with the queue element of each consumer queue to an associated event consumer, (b) modifying the count with each delivery of the event associated with the queue element of the consumer queue, and (c) retaining the queue element of the active queue in the active queue until the count reaches a predetermined value indicating that all interested event consumers have received the event;
   wherein the active queue, the plurality of consumer queues and the control means enable one or more event suppliers to forward events to the event management service and the event management service to forward events to the one or more event consumers even if multiple event consumers cannot consume events being generated by the one or more event suppliers as the events are being generated.

2. The queueing mechanism as described in claim 1 further including an input queue having queue elements each associated with an event generated by the one or more event suppliers.

3. The queueing mechanism as described in claim 2 wherein the one queue element of the active queue is obtained from the input queue.

4. The queueing mechanism as described in claim 2 wherein the control means comprises a first process running in a first thread of a process control for processing queue elements of the input queue.

5. The queueing mechanism as described in claim 4 wherein the control means also includes a second process running in a second thread of the process control for processing queue elements of at least one of the consumer queues.

6. The queueing mechanism as described in claim 5 wherein the control means also includes a third process running in a third thread of the process control for processing remote procedure calls to the input queue.

7. The queueing mechanism as described in claim 1 wherein the active queue has a plurality of queue elements each associated with an event that at least one event consumer has an interest in receiving, each said queue element associated with an event having a count identifying a number of event consumers that have interest in receiving the event.

8. The queueing mechanism as described in claim 7 wherein the control means comprises a plurality of process routines executing in different threads of a multi-threaded control routine.

9. In a computer network providing a distributed computing environment in which users can access distributed resources, the improvement comprising:

event notification service means for establishing an event channel through which one or more event consumers are notified of events wherein an event represents a change in state of a resource in the distributed computing environment and is supplied to the event notification service means by an event supplier; and a queueing mechanism comprising:

an active queue having at least one queue element associated with an event that at least one event consumer has an interest in receiving, said queue element having a count identifying a number of event consumers that have interest in receiving the event;

a plurality of consumer queues each associated with an event consumer having an interest in receiving the event, each consumer queue having a queue element pointing to the at least one queue element in the active queue; and control means for (a) delivering an event associated with the queue element of each consumer queue to an associated event consumer, (b) modifying the count with each delivery of the event associated with the queue element of a consumer queue, and (c) retaining the queue element of the active queue in the active queue until the count reaches a predetermined value indicating that all interested event consumers have received the event;

wherein the active queue, the plurality of consumer queues and the control means enable one or more event suppliers to forward events to the event notification service means and the event notification service means to forward events to the one or more event consumers even if multiple event consumers cannot consume events being generated by the one or more event suppliers as the events are being generated.

10. The computer network as described in claim 9 wherein the queueing mechanism further includes an input queue for receiving queue elements each associated with an event generated by the one or more event suppliers.

11. The computer network as described in claim 10 wherein the control means comprises a plurality of process routines executing in different threads of a multi-threaded control routine.

12. The computer network as described in claim 11 wherein each of the consumer queues has a process routine associated therewith executing in one of the different threads.

13. A computer system for use in a distributed computing environment, comprising:

a processor;

an operating system running on the processor;

event management service (EMS) program means run by the operating system for establishing an event channel through which one or more consumer processes are notified of events, wherein an event represents a change of state of a resource in the distributed computing environment and is provided to the event management service program means by a supplier process; and queueing means for enabling one or more supplier processes to forward events to the event management service program means and the event management service program means to forward events to the one or more consumer processes even if multiple consumer processes cannot consume events being generated by the one or more supplier processes as the events are being generated; wherein the queueing means comprises:

an active queue having at least one queue element associated with an event that at least one event consumer has an interest in receiving, said queue element having a count identifying a number of event consumers that have interest in receiving the event;

a plurality of consumer queues each associated with an event consumer having an interest in receiving the event, each consumer queue having a queue element pointing to the at least one queue element in the active queue; and control means for (a) delivering an event associated with the queue element of each consumer queue to an associated event consumer, (b) modifying the count with each delivery of the event associated with the queue element of a consumer queue, and (c) retaining the queue element of the active queue in the active queue until the count reaches a predetermined value indicating that all interested event consumers have received the event.

14. The computer system as described in claim 13 wherein the queueing means further includes an input queue having queue elements each associated with an event generated by the one or more event suppliers.

15. An article of manufacture, comprising:

a computer-readable storage medium having a substrate; and computer program data encoded in the substrate of the computer-readable storage medium, wherein the storage medium so configured causes a computer to manage event data, wherein the computer program data comprises:

event management service (EMS) program means for establishing an event channel through which one or more consumer processes are notified of events, wherein an event represents a change in state and is supplied to the event management service program means by a supplier process; and means for queueing events when multiple consumer processes cannot consume events being generated by one or more supplier processes as the events are being generated, wherein the queueing means comprises:

an active queue having at least one queue element associated with an event that at least one event consumer has an interest in receiving, said queue element having a count identifying a number of event consumers that have interest in receiving the event;

a plurality of consumer queues each associated with an event consumer having an interest in receiving the event, each consumer queue having a queue element pointing to the at least one queue element in the active queue; and control means for (a) delivering an event associated with the queue element of each consumer queue to an associated event consumer, (b) modifying the count with each delivery of the event associated with the queue element of a consumer queue, and (c) retaining the queue element of the active queue in the active queue until the count reaches a predetermined value indicating that all interested event consumers have received the event.

* * * * *

UNITED STATES PATENT AND TRADEMARK OFFICE
CERTIFICATE OF CORRECTION

PATENT NO : 5,881,315
DATED : March 9, 1999
INVENTOR(S): Richard Jay Cohen

It is certified that error appears in the above-identified patent and that said Letters Patent is hereby corrected as shown below:

In Claim 9, line 21, after events, insert --,--

Signed and Sealed this

Tenth Day of August, 1999

Attest:

Q. TODD DICKINSON

Attesting Officer     Acting Commissioner of Patents and Trademarks